United States Patent [19]

Chickering et al.

[11] 4,422,965

[45] Dec. 27, 1983

[54] NUCLEAR WASTE ENCAPSULATION IN BOROSILICATE GLASS BY CHEMICAL POLYMERIZATION

[75] Inventors: Ronald W. Chickering, Hempfield Township, Westmoreland County; Bulent E. Yoldas, Churchill; Bruce H. Neuman, Salem Township, Westmoreland County, all of Pa.

[73] Assignee: Westinghouse Electric Corp., Pittsburgh, Pa.

[21] Appl. No.: 176,738

[22] Filed: Aug. 11, 1980

[51] Int. Cl.$^3$ .............................................. G21F 9/16
[52] U.S. Cl. ..................................... 252/629; 501/12
[58] Field of Search ........................... 252/629; 501/12

[56] References Cited

U.S. PATENT DOCUMENTS

| | | | |
|---|---|---|---|
| 3,298,960 | 1/1967 | Pitzer | 252/628 |
| 3,791,808 | 2/1974 | Thomas | 501/12 |
| 4,028,085 | 6/1977 | Thomas | 501/12 |
| 4,224,177 | 9/1980 | Macedo et al. | 252/629 |

OTHER PUBLICATIONS

Yoldas, "Monolithic Glass Formation by Chemical Polymerization", *J. Mater. Sci.*, 14 (1979), pp. 1843–1849.

"Process Produces Glass at Room Temperature", *Indus. Res. and Devel.*, Jul. 1980, p. 70.

"New Process Breaks Old Glass Theory", *New Scientist*, Jun. 26, 1980, p. 396.

*Primary Examiner*—Deborah L. Kyle
*Attorney, Agent, or Firm*—R. D. Fuerle

[57] ABSTRACT

Disclosed is a process for containing a solution of nuclear waste, where the nuclear waste is at least 10% sodium or nitrate. A composition is prepared in an alcohol of about 1 to about 99% of a silicon alkoxide and about 1 to about 99% of a boron alkoxide. The pH of the nuclear waste solution is adjusted to about 4 to about 6 and the pH of the composition is adjusted to match. The composition is dried to about 50 to about 75% of its original volume and is mixed with up to about 30% of the solution of nuclear waste, thereby forming a gel. The mixture is dried and heated at up to about 500° C. Finally, it is consolidated either by warm pressing at about 400° to about 800° C. at about 40,000 to about 100,000 psi, or by melting at about 700° to about 1150° C.

11 Claims, No Drawings

NUCLEAR WASTE ENCAPSULATION IN BOROSILICATE GLASS BY CHEMICAL POLYMERIZATION

CROSS REFERENCE TO RELATED APPLICATIONS

This application is related to applications Ser. Nos. 162,966 and 162,967, filed June 25, 1980 by J. M. Pope et al. entitled "CONTAINMENT OF NUCLEAR WASTE" and "CONTAINING NUCLEAR WASTE VIA CHEMICAL POLYMERIZATION," respectively.

BACKGROUND OF THE INVENTION

The raffinate stream from the first extraction stage of the "PUREX" process (used to recover plutonium and uranium from spent fuel) and the liquid metallic sodium used to cool some nuclear reactors is contaminated with various radioactive isotopes. The raffinate stream is stripped of nitric acid and is a high level waste which consists primarily of nitrates in an aqueous solution. The metallic sodium is converted into stable compounds such as a hydroxide, a salt, or an alkoxide by reacting the sodium with either water, an acid, or an alcohol.

The current practice is to dehydrate the liquid waste by heating, then to consolidate the residue by either calcination or vitrification at high temperatures. The resulting metallic hydroxides can be converted into a vitreous waste form using conventional glass technology.

Unfortunately, because of the high fluxing temperatures (about 1150° C.) which are required to melt the glass, additional off-gassing scrubbing capacity or other absorbent procedures are needed to deal with the volatilization of radionuclides such as iodine, cesium, and ruthenium. These high fluxing temperatures can also shorten the life of the furnace and can create problems with the materials into which the molten glass is cast, such as the sensitization of stainless steel to stress corrosion cracking.

PRIOR ART

U.S. patent application Ser. No. 065,706, filed Aug. 10, 1979, by B. E. Yoldas, discloses the hydrolyzation of alkoxides and their subsequent polymerization to form glass structures.

SUMMARY OF THE INVENTION

We have discovered that nuclear waste containing a high (i.e., greater than about 10% of dissolved solids) concentration of nitrates and sodium compounds can be encapsulated in borosilicate glasses by chemical polymerization at much lower temperatures than required in conventional glass-forming processes. Because of the low temperatures used in the process of this invention, the volatilization losses that occur in conventional glass-forming processes are avoided.

DESCRIPTION OF THE INVENTION

The glass-forming composition of this invention which is used to contain the nuclear waste is prepared from a silicon alkoxide and a boron alkoxide. The silicon alkoxide has the general formula $Si(OR)_4$, where each R is independently selected from alkyl to $C_6$. The R group is preferably $C_2H_5$ because that compound is readily available and the resulting ethyl alcohol which is formed during polymerization is easy to handle.

The boron compound used in the glass-forming composition of this invention has the general formula $B(OR)_3$, where each R is independently selected from alkyl to $C_6$. The R group is preferably $CH_3$ as that compound is more readily available and the resulting alcohol is easier to deal with. The composition may range from about 1 to about 99% (all percentages herein are by weight) of the silicon compound to about 1 to about 99% of the boron compound, but preferably is about 65 to about 95% of the silicon compound to about 5 to about 35% of the boron compound.

The silicon and boron compounds are normally partially hydrolyzed with water according to the equations:

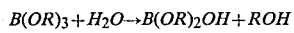

The resulting partially hydrolyzed alkoxide can then polymerize by the reaction of hydroxyl groups with alkoxide groups, condensing out alcohol, forming an oxide bond:

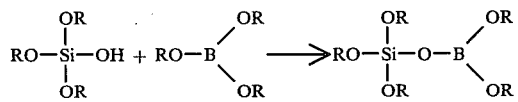

The process continues until all of the R groups have been hydrolyzed or reacted, resulting in an organic-free oxide network. However, if one or more of the materials to be reacted into the polymeric structure is a hydroxide, then unhydrolyzed silicon alkoxides can be used to tie the other materials into an oxide network as follows:

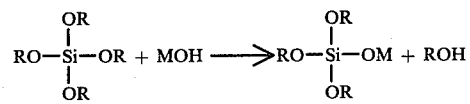

where M is a metal ion such as sodium.

It should be obvious to anyone skilled in the art that the mechanism leading to glass network formation is the presence of two active groups in the solutions, hydroxyls and alkoxides. The reaction of these groups with each other leads to the formation of a bridging oxygen bond which causes the chemical fixation of the involved ions, whether or not they are radioactive. There are several methods of accomplishing this, including partial hydrolysis or using unhydrolyzed alkoxides in conjunction with hydroxides.

The silicon compound and the boron compound can be mixed together, then diluted with sufficient alcohol to allow mixability of the water added for hydrolysis, about 30 to about 65%, followed by partial hydrolyzation by the addition of water. Boron can be completely hydrolyzed to a hydroxide precipitate which can be reacted later with an unhydrolyzed or partially hydrolyzed silicon alkoxide to a clear solution. The alkoxide mixture is partially hydrolyzed using 0.2 to two moles of water per mole of the alkoxide. The silicon and boron alkoxide mixture is hydrolyzed in alcohol. Any alcohol which is miscible with water can be used, but the alcohol is preferably the same alcohol that will be given off during polymerization so that it is not necessary to separate different alcohols. Ethyl alcohol is preferable because its boiling range and water solubility makes it easy to work with. It is preferable to add the water to the alcohol and then add the water-alcohol solution to the alkoxide solution. The alkoxide mixture can be modified to improve the glass workability and durability by the addition of alkoxides, acids, or salts of metals such as titanium, lithium, sodium, potassium, and calcium. These metal compounds are the common glass modifiers for borosilicate glasses. The pH of the glass-forming composition is altered with acetic acid, for example, so that it approximates the pH of the solution of nuclear waste. The glass-forming composition is then dried to about 50 to about 75% of its original volume.

The nuclear waste to be treated preferably consists primarily of a solution of inorganic compounds, (e.g., NaOH); at least about 10% of the solid content of the nuclear waste solution is organic compounds. The remaining proportion of the solid content of the nuclear waste solution consists of actinides or transuranic fission elements, various corrosion product elements such as iron, manganese, nickel, and titanium, and nitrates and hydroxides. It may also contain a minor (less than 5%) amount of solid waste. This nuclear waste is a radioactive waste which comes from liquid metal-cooled reactors and reprocessing plants. Before it is added to the composition, it is first treated with any acid such as acetic acid or with an alkali compound such as sodium hydroxide to adjust its pH to about 4 to about 6.

The nuclear waste solution may consist of about 5 to about 50% dissolved solids. Up to about 35% of the nuclear waste solution may be added to the glass-forming composition (based on total weight of glass-forming composition plus nuclear waste). Once the nuclear waste has been added to the glass-forming composition, a chemical reaction occurs between the alkoxides and the nuclear waste compounds which results in the formation of a polymeric structure which incorporates and chemically ties the nuclear waste into an oxide network.

After the nuclear waste solution has been added to the glass-forming composition and the polymerization reaction is complete, a sufficient amount of a 50% acetic acid and water solution should be added to peptize the mixture if necessary to remove the remaining unhydrolyzed alkyl groups. The mixture is then dried at a temperature between room temperature and the boiling point of the alcohol which is present to remove all of the free liquids in the mixture. The mixture is then heated up to between 250° and 500° C. to remove the hydroxyl groups and any residual organic compounds which may be present.

In order to densify and compact the resulting product, which reduces its surface area and increases its leach resistance, it can be warm-pressed at about 400° to about 800° C. at a pressure of about 40,000 to about 100,000 psi. Alternatively, it can be melted at about 700° to about 1150° C.

The following examples further illustrate this invention.

EXAMPLE I

This first example illustrates the encapsulation of a simulated high sodium content nuclear waste where the sodium is in the form of sodium hydroxide and the glass contains 5.8% $Na_2O$.

Three cubic centimeters (cc) of $B(OCH_3)_3$ and 20 cc of $Si(OC_2H_5)_4$ were mixed together and allowed to age for 16 hours. Then 15 cc of pure ethyl alcohol, 2 cc deionized water, and 1 cc glacial acetic acid were mixed together. This solution was allowed to set for approximately 15 minutes before it was added to the aged alkoxide solution. The new solution was aged and partially dehydrated in open air for 16 hours, reducing the solution volume to 23 cc.

A simulated sodium nuclear waste was prepared by dissolving 0.5 gram of sodium hydroxide in 1.2 grams deionized water. The acidity of the sodium hydroxide solution was adjusted with 1 cc glacial acetic acid to a pH of 4. The solution was allowed to set for about 30 minutes to ensure the completion of the reaction. The NaOH solution was then slowly mixed with the aged alkoxide mixture for about one minute. The resulting mixture was a clear liquid which gelled to form a single phase stiff gel in about 10 minutes. The stiff gel was was aged in open air for seven days to dehydrate it and to evaporate organics. During the aging process the gel particles were glassy in appearance. The gel fragmented and was pyrolyzed at 500° C. for 20 minutes in open air. The pyrolyzed glass ranged from black to clear, depending upon the residual carbon content. The glass had the following chemical composition:

$SiO_2$-77.4% by weight
$B_2O_3$-13.9% by weight
$Na_2O$-5.6% by weight and the balance carbon. X-ray diffractometer analysis indicated that the material was free of crystalline phases (i.e., that it was amorphous).

EXAMPLE II

This example illustrates the encapsulation of simulated sodium nuclear waste in a borosilicate glass containing 37.5% $Na_2O$. The alkoxide solution was prepared and aged for 16 hours in the same manner as in Example I. The NaOH simulated nuclear waste solution was prepared by dissolving 3.7 grams of NaOH in 7.8 cc of deionized water. The pH of the NaOH solution was adjusted as before by adding 7 cc of glacial acetic acid. The NaOH solution was mixed with the same quantity of aged alkoxide precursor solution as in Example I. The resulting mixture was stirred slowly for one minute and was a slightly cloudy single phase liquid. The mixture gelled within 10 minutes to form a stiff single phase gel. The gel was dried and aged in air for seven days which caused it to fragment. The fragments were cloudier than in Example I but still were translucent. The irregularly shaped fragments averaged a half centimeter in width. The dry gel was pyrolyzed at 500° C. for 20 minutes in open air. The pyrolyzed gel was all black and was analyzed to have the following composition:

53.2% $SiO_2$
37.5% $Na_2O$
9.3% $B_2O_3$

EXAMPLE III

This example illustrates the incorporation of a simulated high-level waste nitrate solution containing sodium nitrate and sodium nitrite into the alkoxide glass composition. The aged alkoxide precursor mixture was the same solution used in Examples I and II. The simulated waste solution consisted of two 2.4 grams sodium nitrate, 1.0 grams sodium nitrite, and 0.5 gram sodium hydroxide in 6.6 cc deionized water. The pH of this solution was adjusted to 4 by adding 7 cc of glacial acetic acid. The acetic acid addition was exothermic and care had to be exercised on this step of the process. After 15 minutes the reaction was finished and the simulated waste solution was added to the same volume of aged alkoxide precursor mixture. The mixing of the simulated waste solution and the alkoxide solution produced a two-phase liquid. The upper liquid layer was more translucent than the bottom layer, which was nearly opaque. The two-phase solution was made into a very translucent, almost clear single-phase liquid, by mixing in a solution of 3 cc glacial acetic acid and 7 cc dionized water. The final solution took 45 minutes to dry to a clear, stiff single phase gel. The stiff gel was aged in open air for 8 days. The gel was then pyrolyzed at 500° C. for 20 minutes which formed a white fragmented glass material of the following composition:

67.7% $SiO_2$
20.5% $Na_2O$
11.8% $B_2O_3$

EXAMPLE IV

Example I was repeated using glasses of the following composition:

| Specimen | Major Glass Components | | |
|---|---|---|---|
| | $SiO_2$ | $Na_2O$ | $B_2O_3$ |
| 1 | 77.4 | 5.6 | 13.9 |
| 2 | 78.3 | 8.0 | 13.7 |
| 3 | 74.1 | 12.9 | 13.0 |
| 4 | 67.7 | 20.5 | 11.8 |
| 5 | 63.8 | 25.8 | 10.5 |
| 6 | 53.2 | 37.5 | 9.3 |

Each of the glasses successfully immobilized the simulated sodium nuclear waste material.

We claim:

1. A method of encapsulating an aqueous solution of nuclear waste, comprising:
    (A) adjusting the pH of said solution of nuclear waste to about 4 to about 6;
    (B) preparing a composition in an alcohol which consists essentially of:
        (1) about 1 to about 99% by weight of a silicon compound having the general formula $Si(OR)_4$ where each R is independently selected from alkyl to $C_6$; and
        (2) about 1 to about 99% by weight of a boron compound having the general formula $B(OR)_3$ where each R is independently selected from alkyl to $C_6$, said composition being partially hydrolyzed;
    (C) adjusting the pH of said composition to about the pH of said solution of nuclear waste;
    (D) drying said composition to about 50 to about 75% of its original volume;
    (E) mixing together up to about 30% by weight of said solution of nuclear waste with said composition, based on total weight, to form a gel;
    (F) drying the mixture at a temperature between room temperature and the boiling point of said alcohol;
    (G) heating said mixture at up to 500° C.;
    (H) consolidating said mixture by
        (1) warm pressing at about 400 to about 800° C. at about 40,000 to about 100,000 psi; or
        (2) melting said mixture at about 700° to about 1150° C.

2. A method according to claim 1 wherein R is $C_2H_5$.

3. A method according to claim 1 wherein said composition is aged before said solution of nuclear waste is mixed with it.

4. A method according to claim 1 wherein said gel is aged prior to drying.

5. A method according to claim 1 wherein the amount of said silicon compound in said composition is about 65 to about 95% and the amount of said boron compound in said composition is about 5 to about 35%.

6. A method according to claim 1 wherein said nuclear waste is an aqueous solution having a solids content of about 5 to about 50%.

7. A method according to claim 1 wherein said composition is partially hydrolyzed after said silicon compound and said boron compound have been mixed together.

8. A method according to claim 1 wherein the alcohol in said composition is about 30 to about 65% of said composition.

9. A method according to claim 1 wherein said alcohol in said composition is ROH where R has been defined above.

10. A method according to claim 1 wherein said pH is adjusted with acetic acid.

11. A glass containing nuclear waste prepared according to the method of claim 1.

* * * * *